(12) United States Patent
Ranganathan et al.

(10) Patent No.: US 10,997,010 B2
(45) Date of Patent: *May 4, 2021

(54) SERVICE METRIC ANALYSIS FROM STRUCTURED LOGGING SCHEMA OF USAGE DATA

(71) Applicant: MICROSOFT TECHNOLOGY LICENSING, LLC, Redmond, WA (US)

(72) Inventors: Aravind Ranganathan, Redmond, WA (US); Sanghmitra Gite, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/365,534

(22) Filed: Mar. 26, 2019

(65) Prior Publication Data

US 2019/0220338 A1 Jul. 18, 2019

Related U.S. Application Data

(63) Continuation of application No. 15/355,420, filed on Nov. 18, 2016, now Pat. No. 10,289,470, which is a
(Continued)

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/008* (2013.01); *G06F 11/0709* (2013.01);
(Continued)

(58) Field of Classification Search
CPC .............. G06F 11/079; G06F 11/0709; G06F 11/0766; G06F 11/0787
See application file for complete search history.

(56) References Cited

U.S. PATENT DOCUMENTS 10,289,470 B2 * 5/2019 Ranganathan ...... G06F 11/0766
2004/0230674 A1 * 11/2004 Pourheidari ............ G06F 9/465
709/223
(Continued)

OTHER PUBLICATIONS

"Summons to Attend Oral Proceedings Issued in European Patent Application No. 15709002.8", Mailed Date: Jul. 16, 2019, 9 Pages.
(Continued)

*Primary Examiner* — Philip Guyton
(74) *Attorney, Agent, or Firm* — Newport IP, LLC; Benjamin Keim

(57) ABSTRACT

Technologies are generally described to provide a passive monitoring system employing a logging schema to track usage data in order to analyze performance and reliability of a service. The logging schema may be configured to track user requests as each request is received and processed at individual subsystems of the collaborative service. A logging entry may be created at a data store of the service, where the logging entry includes a subsystem name, an operation performed by the subsystem to fulfill the request and start and end times of the operation. The logging schema may also detect errors fulfilling the requests, and may classify detected errors into a bucket, where each bucket denotes a failure scenario. Reliability of the service may be calculated based on analysis of the buckets to compute error rates. Reports may be generated to enable continuous monitoring of a performance and reliability of the system.

20 Claims, 6 Drawing Sheets

Related U.S. Application Data continuation of application No. 15/153,738, filed on May 13, 2016, now Pat. No. 9,503,335, which is a continuation of application No. 14/191,058, filed on Feb. 26, 2014, now Pat. No. 9,354,963.

(51) Int. Cl.
*H04L 12/26* (2006.01)
*G06F 11/34* (2006.01)
*G06F 11/30* (2006.01)

(52) U.S. Cl.
CPC ...... *G06F 11/0751* (2013.01); *G06F 11/0766* (2013.01); *G06F 11/0778* (2013.01); *G06F 11/0787* (2013.01); *G06F 11/3006* (2013.01); *G06F 11/3419* (2013.01); *G06F 11/3466* (2013.01); *H04L 43/04* (2013.01); *H04L 43/0823* (2013.01); *G06F 11/0772* (2013.01); *G06F 2201/875* (2013.01)

(56) References Cited

U.S. PATENT DOCUMENTS

| | | | |
|---|---|---|---|
| 2011/0246641 A1 | 10/2011 | Pugh et al. | |
| 2012/0311138 A1* | 12/2012 | Inamdar | G06F 11/3423 709/224 |
| 2015/0180703 A1* | 6/2015 | Callister | G06F 11/3476 714/47.2 |
| 2016/0371710 A1 | 12/2016 | Pugh et al. | |

OTHER PUBLICATIONS

"Office Action Issued in European Patent Application No. 15709002.8", dated May 7, 2019, 6 Pages.

"Extended European Search Report Issued in European Patent Application No. 20181655.0", dated Oct. 26, 2020, 9 Pages.

* cited by examiner

SERVICE METRIC ANALYSIS FROM STRUCTURED LOGGING SCHEMA OF USAGE DATA

CROSS-REFERENCE TO RELATED APPLICATION

This application is a continuation under 35 U.S.C. § 120 of co-pending U.S. patent application Ser. No. 15/355,420, filed on Nov. 18, 2016, which is a continuation under 35 U.S.C. § 120 of U.S. patent application Ser. No. 15/153,738 filed on May 13, 2016, now U.S. Pat. No. 9,503,335, which is a continuation under 35 U.S.C. § 120 of U.S. patent application Ser. No. 14/191,058 filed on Feb. 26, 2014, now U.S. Pat. No. 9,354,963. The disclosures of the U.S. Patent Applications are hereby incorporated by reference in their entirety.

BACKGROUND

In a collaborative environment, users may interact with a collaborative service over a network. The collaborative service may be a service providing a multitude of applications and capabilities to many users over the network concurrently. The collaborative service may monitor traffic patterns and data requests from the multiple users in order to continuously monitor performance and reliability of the service. Tracking large amounts of data requests received at the collaborative service and processed by multiple subsystems of the service may create a complex set of data, and it may be difficult to aggregate and sort through the data to extract valuable service related metrics for consistently evaluating system performance and reliability.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a monitoring system employing a logging schema to track usage data at a collaborative service. The logging schema may be configured to track user requests as requests are received and processed at individual subsystems of the collaborative service. A logging entry may be created at a data store of the service, where the logging entry may include a subsystem processing the request, an operation performed by the subsystem to fulfill the request, start and end times of the operation, locale information for the request, and errors detected in fulfilling the requests. The logging schema may enable error detection at subsystems of the service to provide continuous monitoring of a performance and reliability of the service.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
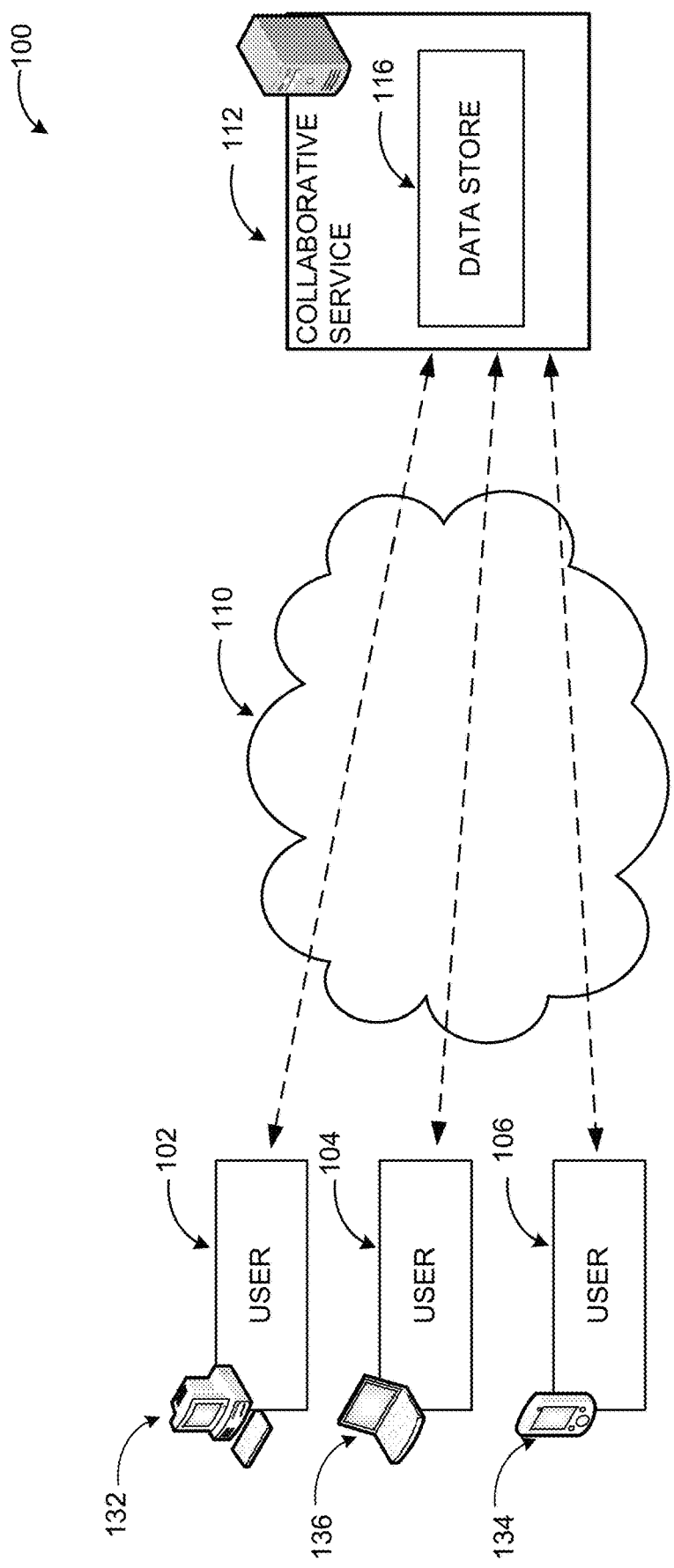
FIG. 1 illustrates an example cloud-based environment where users interact with a collaborative service over a network.

As briefly described above, a monitoring system is described to log usage data and provide performance and reliability analysis of a service, such as a collaborative service. The monitoring system may employ a logging schema to requests received and processed by one or more subsystems of the collaborative service to fulfill the request. A logging entry may be created at a data store of the service, where the logging entry may include information about each individual request. Each logging entry may include a name of a subsystem processing the request, an operation performed by the subsystem to fulfill the request, start and end times of the operation, user locale information, and errors detected in processing the request. The logging schema may also enable continuous detection of errors fulfilling the requests. Detected errors may be categorized into error buckets where each bucket denotes a failure scenario. Reliability of the service may be calculated based on analysis of the buckets to compute error rates. Reports may be generated to enable continuous monitoring of a performance and reliability of the system.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for a monitoring system to log usage data and provide performance and reliability analysis of a service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example cloud-based environment where users interact with a collaborative service, according to some example embodiments.

As demonstrated in diagram 100, users (102, 104, and 106) may access a service or application such as a collaborative service 112, over a cloud-based network 110. The collaborative service 112 may be hosted at a remote server and may be accessed through a user's client device over the cloud-based network 110. A local version of the collaborative service 112 may also be locally hosted at the user's client device, and data associated with the local collaborative service 112 may be retrieved over the cloud-based network 110. Some example client devices may include a laptop computer 136, a desktop computer 132, a smart phone 134, a car phone, a mobile phone, a tablet, and/or a home automation device. While the network is described as a cloud-based network, embodiments are not limited to cloud-based networks and may be implemented in various local and hosted networks.

An example collaborative service 112 may be a service enabling multiple users to access multiple applications associated with the service over a network, such as the cloud-based network 110. Applications associated with the service may provide a multitude of tools and capabilities such as document and file management, collaboration, social networks, extranets, websites, enterprise management, document sharing, email, text messaging, voice over internet protocol (VOIP), conferencing, instant messaging, phone calls, contacts, management, calendar management, and other similar capabilities, to name a few. The collaborative service 112 may also provide system integration, process integration, and workflow automation capabilities. Different types of data associated with the collaborative service 112 such as software data, application data, communication data (e.g. email messages, text messages, instant messages, voicemail messages), and other similar data may be received from the collaborative service 112 and interacted with at the user's client device.

Data associated with the collaborative service 112 may be hosted at a data store 116 associated with the collaborative service 112. The data store 116 may retrieve and store data as requested by applications associated with the collaborative service 112, including applications locally executed on individual client devices across a network, such as the cloud based network 110. In an example embodiment, when a user interacts with the collaborative service 112 over the network from the user's client device, a request may be sent to the collaborative service 112 to retrieve data in order to respond to and fulfill the request. Example requests may include starting an application, opening a document, initiating a conversation, interacting with a document or application, retrieving data associated with an application, and other similar requests. The collaborative service 112 may continuously receive a multitude of requests from multiple users accessing the collaborative service 112 over the network. Tracking the multitude of data requests may enable detailed monitoring of a performance of the collaborative service 112 and may enable calculation of various service metrics and key performance indicators of the collaborative service 112 such as user traffic, reliability, and error rates. A system according to embodiments may provide a passive monitoring system to log usage data according to a logging schema as requests are received and processed by subsystems of the collaborative service 112. Based on the logged usage data, performance and reliability reports may be generated to enable the collaborative service to be continuously monitored, analyzed, and improved.

Figure 2:
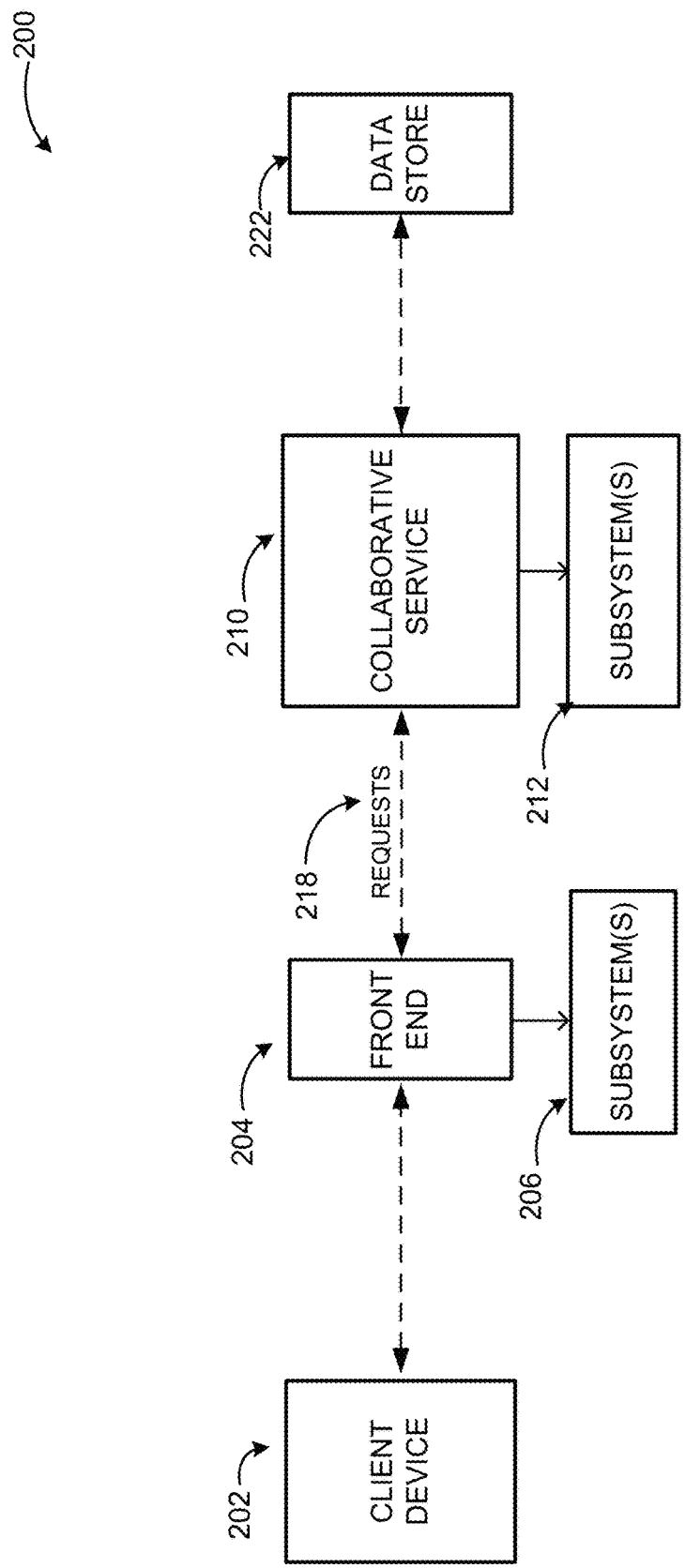
FIG. 2 illustrates an example architecture of a service including a plurality of subsystems where a logging schema for tracking usage data may be implemented.

FIG. 2 illustrates an example architecture of a service including a plurality of subsystems where a logging schema for tracking usage data may be implemented, according to some embodiments.

As illustrated in diagram 200, a collaborative service 210 may include multiple subsystems or layers configured to receive requests 218 from a client device 202 over a network and perform operations to process the requests 218. Example subsystems may include a front end 204 where a request may be initially received from a client device 202 over a network, a middle layer, which may include a multitude of subsystems (e.g. 206, 212) configured to fulfill particular data requests 218, and a back end data store 222 where data associated with each subsystem of the collaborative service 210 may be stored. The different subsystems may be executed on different virtual machines associated with the collaborative service 210 or may be on a same virtual machine. Additionally, the collaborative service 210 may also perform a set of actions to fulfill a request, where the set of actions may not be confined to a particular subsystem.

A passive monitoring system, according to embodiments, may be configured to track requests 218 as the requests 218 travel sequentially or in parallel across different subsystems and virtual machines of the collaborative service before the request is processed and a response is returned to the user. The passive monitoring system may also be configured to employ a logging schema to log tracked usage data at the back-end data store 222. The logging schema may be configured to track usage data, in real-time, as each request is received and processed at each individual subsystem of the collaborative service 210 in order to track a processing path of the request. The logging schema may track usage data at a subsystem level and may also track and log usage data for sub-operations within each sub-system to process the request as well. In an example scenario, each request may be tracked as it enters and exits each subsystem (e.g. 206, 212) of the collaborative service 210, and the logging schema may provide a subsystem and operation based entry in the back end data store 222 for each request received and processed by the collaborative service 210. Each entry at the back end data store 222 may include the subsystem and operation name, an entry and exit time from each subsystem, a start time and end time for an operation performed by the subsystem to fulfill the request, user locale information for the initial request, and error information associated with processing of the request at each subsystem. The data store at the back end may include a data store interface configured to receive usage data from multiple different services as part of a distributed system. The data store associated with the collaborative service 210 may also be an external data store hosted separately from the collaborative service as part of a 210. An external data store may receive data from multiple different services as part of a distributed system.

In an example scenario, when a request is received, the logging schema may identify and name the subsystem where the request is received and an operation is initiated. The subsystem name may be a component of the collaborative service 210 that handles the request. Additionally, the logging schema may define the particular operation executed by the subsystem to process the request. A start time and end time of the operation at the subsystem may also be recorded. The end time may be used with the start time to determine a response time or a processing time of the subsystem to provide a response to a request. Maintaining a record of user requests may enable the collaborative service 210 to continuously monitor service performance, traffic volume, and to track errors to determine service reliability. The record of user requests may also enable observation of popular features of the service based on user traffic subsystems seeing least and most usage, and observation about a nature of user interaction with the service, such as a pattern of operations performed by a user under various scenarios.

In a system according to embodiments, the passive monitoring system may also enable error detection and tracking as subsystems process the requests 218 to enable a determination of service reliability. When an error processing the request is detected at one of the subsystems, the logging schema may record an error with the logging entry at the back-end data store 222. The logging entry may include an error description, which may include a detailed description of the type of processing error that occurred and the subsystem name where the error occurred. The error description may include an internal error code, which may be a local code identifier for the error that may be recognized by the collaborative service 210. The internal error code may be mapped to the error description to provide a user friendly error description that a user of the collaborative service may recognize and understand. The user facing error message may be localized, such that for a same internal error, different error messages based on user localization may be generated. The logging entry for the error may also include an error type, which may include a locale agnostic string to categorize the type of the error that was detected for the request and associated operation at the subsystem.

Figure 3:
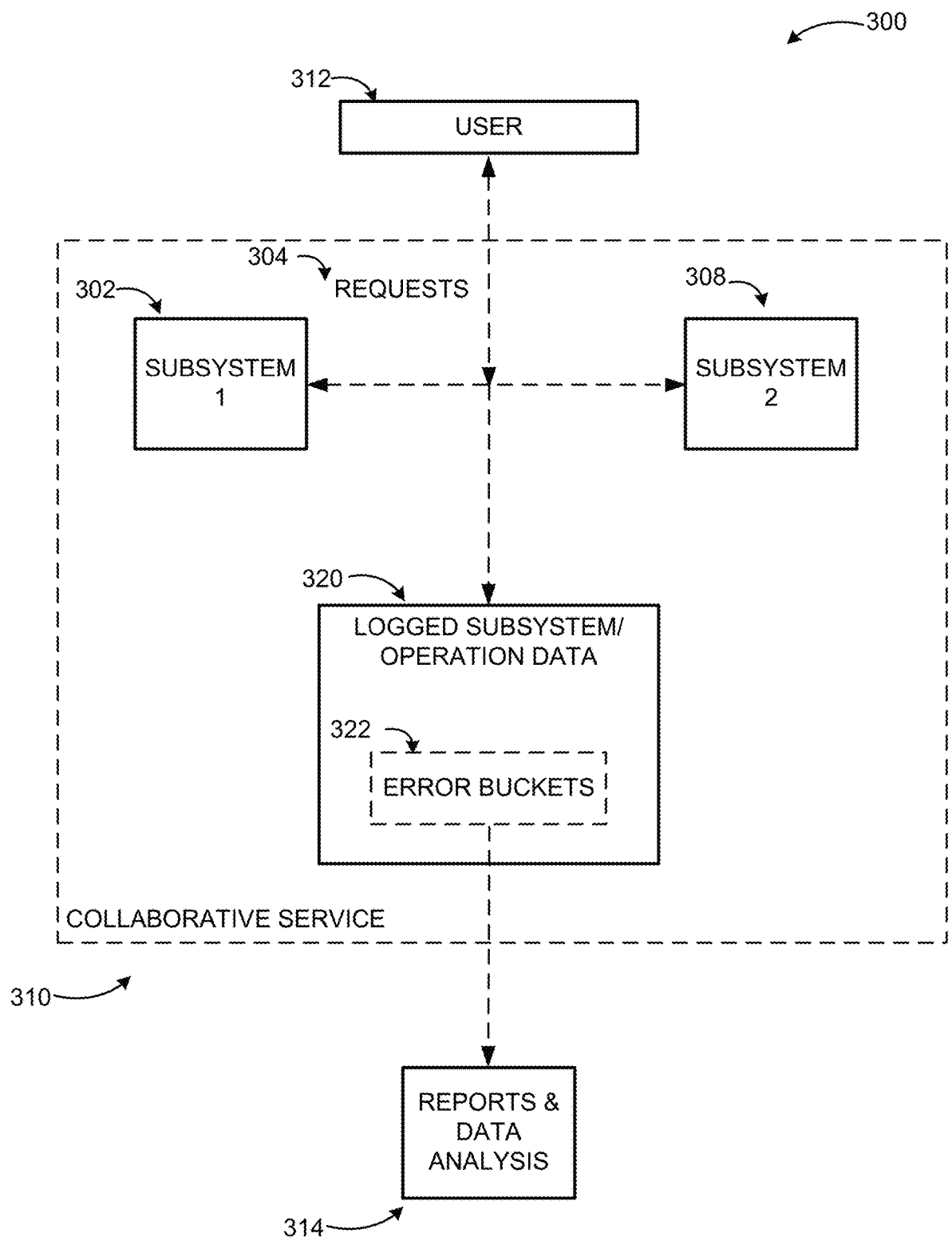
FIG. 3 illustrates a conceptual diagram of logging usage data and generating error reports at a service.

FIG. 3 illustrates a conceptual diagram of logging usage data and generating error reports at a service, according to some embodiments.

As previously described, a passive monitoring system may employ a logging schema to track usage data at subsystems of a collaborative service 310 in order to provide detailed information about performance and reliability of the collaborative service 310. As illustrated in diagram 300, one or more requests 304 may be received at the collaborative service 310, and the requests 304 may be processed at one or more subsystems (e.g. 302, 308) of the collaborative service 310. Operation and subsystem specific usage data 320 may be logged at a data store of collaborative service 310 to create a detailed log of usage data associated with the collaborative service. For example, each time a request is received and processed at a subsystem, the subsystem processing the request may be recorded, and an operation executed to process the request may also be reported. A logging entry including the specific subsystem and operation associated with the request may be recorded at the data store. The logging entry may include additional request related data including start and end times of the request, and user locale information. The user locale information and other user identifiable information may be anonymized to protect individual user privacy. The passive monitoring system may also enable particular subsystems and/or operations of the service to be monitored in order to determine a performance and reliability of a particular subsystem of the collaborative service, and of the collaborative service overall.

In order to provide a performance and reliability analysis of the collaborative service, error detection and tracking may be implemented. When a request 304 is received at a subsystem (e.g. 302, 308) of the collaborative service 310, the passive monitoring system may detect whether the request is fulfilled. If the request is fulfilled, the request may be recorded as a success. If the request is not fulfilled, then the request may be recorded as a detected error. The recorded errors may be utilized to generate performance and reliability reports 314 for the collaborative service 310.

In a system according to embodiments, in order to generate an error detection record to enable service reliability analysis, the system may monitor each request received at one or more subsystems (302, 308) of the collaborative service 310, and upon detection of an error in processing the request, the error may be recorded. Each detected error may be classified into a bucket 322, or category, of error types, where each bucket 322 denotes different failure and success scenarios. For example, a bucket may denote a particular error type or may denote a particular scenario, such as a scenario where further user action is required in order to complete an operation. Additionally, other request types may also be classified into buckets associated with a particular request type. In an example scenario, when an error is first detected, the error may be classified into an initial uncategorized bucket 322 until the error type is determined. Upon determination of the error type, the error may be classified into a labeled bucket 322 according to the error type. Subsequently, detected errors may be classified into pre-existing buckets based on error type. If a newly detected error does not belong in a pre-existing error bucket, a new bucket may be created. New buckets 322 may be continuously added based on newly detected error scenarios. An additional error bucket may be created to classify detected errors where the error is due to the fact that the operation is not supported by the collaborative service. A success bucket may store requests recorded as successes. Reliability of the collaborative service 310 may be calculated based on analysis of the buckets 322 to compute error rates. Absolute numbers and percentages may be computed for each bucket, and an overall service reliability may be measured as the sum of percentage of "Success" and "Errors" buckets.

In a system according to embodiments, reports 314 may be generated based on the logged error data. The reports 314 may be generated for any time period, such as daily, weekly, monthly, yearly, or other customizable time period. Additionally, the reports 314 may be provided based on default parameters and may also be generated based on administrator or user customized parameters. In some embodiments, the generated reports 314 may be configured to provide raw data displaying statistics of the detected errors associated with subsystems and operations of the service. In other embodiments, the reports 314 may provide an analysis of data based on predefined and customizable settings. For example, the reports 314 may provide a performance analysis of a particular operation type or subsystem, or other specified parameters. The performance analysis may be determined by accounting for factors that may influence whether the requests have similar expected performance, such as success/failure of the request, an amount of data expected to be processed by the request, and other similar parameters. Furthermore, the generated reports 314 may provide auditability of the service performance. For example, the reports may provide real-time real user data about error rates and a service reliability, and the collaborative service 310 may provide the reports to clients to demonstrate actual error rates and to guarantee reliability. The passive monitoring system may also be configured to distinguish between real user data and synthetic data (e.g. bot data), and to provide reports based on real user data to provide an accurate performance and reliability analysis of the collaborative service based on real user data. The reliability of particular subsystems, features, or series of operations may also be evaluated based on the logged data and reports. Additionally, the reports may be filtered to enable analysis of particular subsystems and operations of the collaborative service 310.

In an additional embodiment, the passive monitoring system may be configured to generate alerts based on the logged usage and error data. As previously discussed, the passive monitoring system may be customizable, such that administrators may target operations from specific subsystems of the service to be monitored. In a further embodiment, each of the targeted operations and subsystems may be monitored for failed operations and service outages to enable continuous monitoring of service performance, availability, and reliability. The passive monitoring system may be configured to provide an automatic alert if error rates (or user request failures) exceed a predefined threshold value or expectation. The error rate threshold value may be a configurable value. The passive monitoring system may be configured to recognize repeated errors and to issue an alert for new or never before seen errors, so that a same alert is not provided multiple times for a same error. In another embodiment, when particular errors are detected, a troubleshooting message may be automatically provided to aid users and administrators in addressing a particular error. Automatic healing scripts may also be provided to resolve detected errors at the collaborative service 310 without causing a decrease in performance to be experienced by users of the collaborative service 310.

In an additional embodiment, the recorded detected errors may be utilized to track and repair service bugs. Potential bugs may be identified by examining unclassified error buckets to identify common errors being detected and patterns of errors. A bug tracking component of the service may be configured to continuously examine the error buckets for bugs, and to automatically repair detected bugs. The bug tracking component may also be configured to mark bugs that have not been fixed or cannot be fixed. For example, in some cases, a system may choose not to fix a bug for a variety of different reasons, or in other scenarios, the bug may not be able to be repaired. The bug tracking component may distinguish between and indicate errors that cannot be fixed and errors that the system chooses not to fix. The bug tracking component may also indicate an impact of making a decision not to fix in terms of a loss of reliability and/or an expected gain in future performance or reliability of the collaborative service 310. The bug tracking component may be further configured to provide an alert to indicate presence of a bug. A separate bucket for detected bugs may be created, which may enable a reliability report to be created for bugs. The reliability report may indicate what percent of bugs are already fixed and being deployed as part of the next service update, and what percent of the bugs have been marked as "cannot be fixed." Detection of bugs may be utilized in a scalable service deployment scenario to improve the service before a final deployment. For example, the service may be deployed to a first group of users and the service may be monitored for errors bugs. Subsequently, the service may be deployed to a bigger group, and monitored for errors and bugs, until a final deployment to a designated group or a public deployment. At each level of deployment, usage data, including error and bug data, may be monitored and collected to create a comprehensive analysis of the performance and reliability of the service, and to improve the performance and reliability for final deployment.

In a further embodiment, the usage data may be localized according to a user locale, and the usage data may include data strings that may get localized into different languages based on the user locale. Error data may be classified independent of the user locale in order to classify all usage data together without necessitating specialized localized handling by the logging schema to classify error data. Specific user information may also be anonymized to protect user privacy.

The passive monitoring system may be scalable and customizable according to service needs. Users and administrators of the collaborative service 310 may be able to access the logged data at the data store in order to analyze performance of the collaborative service 310. Additional data types may be defined and tracked at each subsystem of the collaborative service to enable the logging schema to be scalable and customizable according to needs of the collaborative service 310. Administrators may also be able to define what subsystems to collect data from and a frequency of data collection according to service needs.

The example applications, devices, and modules depicted in FIGS. 1-3 are provided for illustration purposes only. Embodiments are not limited to the configurations and content shown in the example diagrams, and may be implemented using other engines, client applications, service providers, and modules employing the principles described herein.

Figure 4:
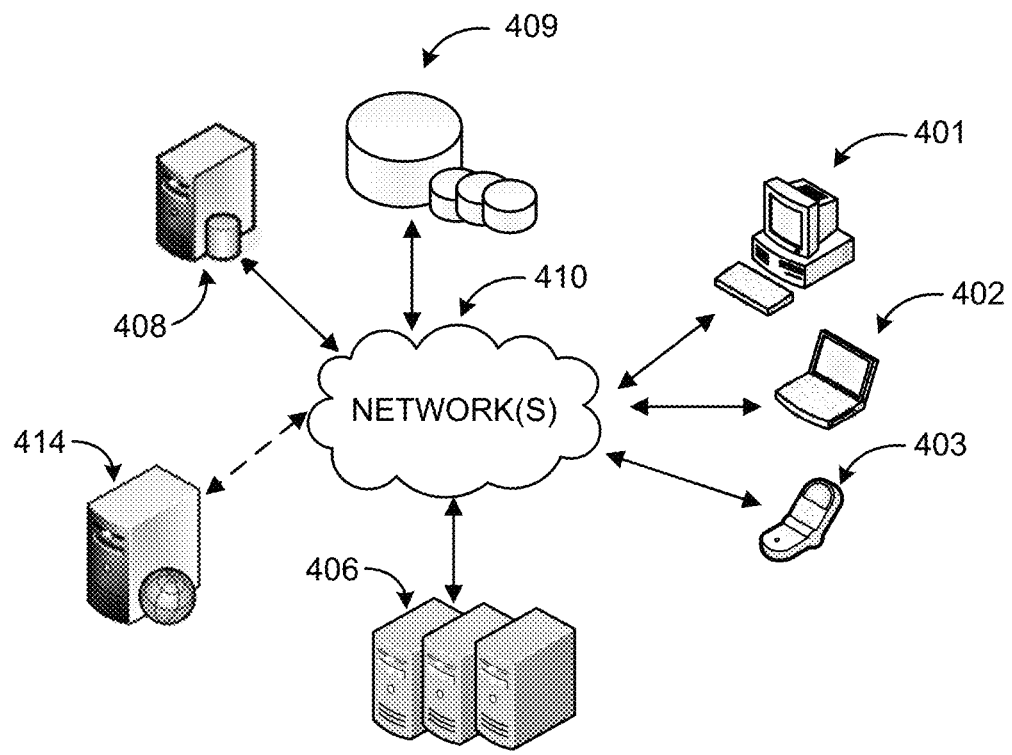
FIG. 4 is a networked environment, where a system according to embodiments may be implemented.

FIG. 4 is an example networked environment, where embodiments may be implemented. In addition to locally installed applications, a passive monitoring system may be provided to track usage data between subsystems and to determine performance and reliability of a service. The passive monitoring system may also be employed in conjunction with hosted applications and services that may be implemented via software executed over one or more servers 406 or individual server 414. A hosted service or application may communicate with client applications on individual computing devices such as a handheld computer, a desktop computer 401, a laptop computer 402, a smart phone 403, a tablet computer (or slate), ("client devices") through network(s) 410 and control a user interface presented to users.

Client devices 401-403 may be used to access the functionality provided by the hosted service or application. One or more of the servers 406 or individual server 414 may be used to provide a variety of services as discussed above. Relevant data may be stored in one or more data stores (e.g., data store 409), which may be managed by any one of the servers 406 or by database server 408.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared, and other wireless media.

Many other configurations of computing devices, applications, data sources, and data distribution systems may be employed to implement a passive monitoring system employing a logging schema to track usage data between subsystems of a service or application. Furthermore, the networked environments discussed in FIG. 4 are for illustration purposes only. Embodiments are not limited to the example applications, modules, or processes.

Figure 5:
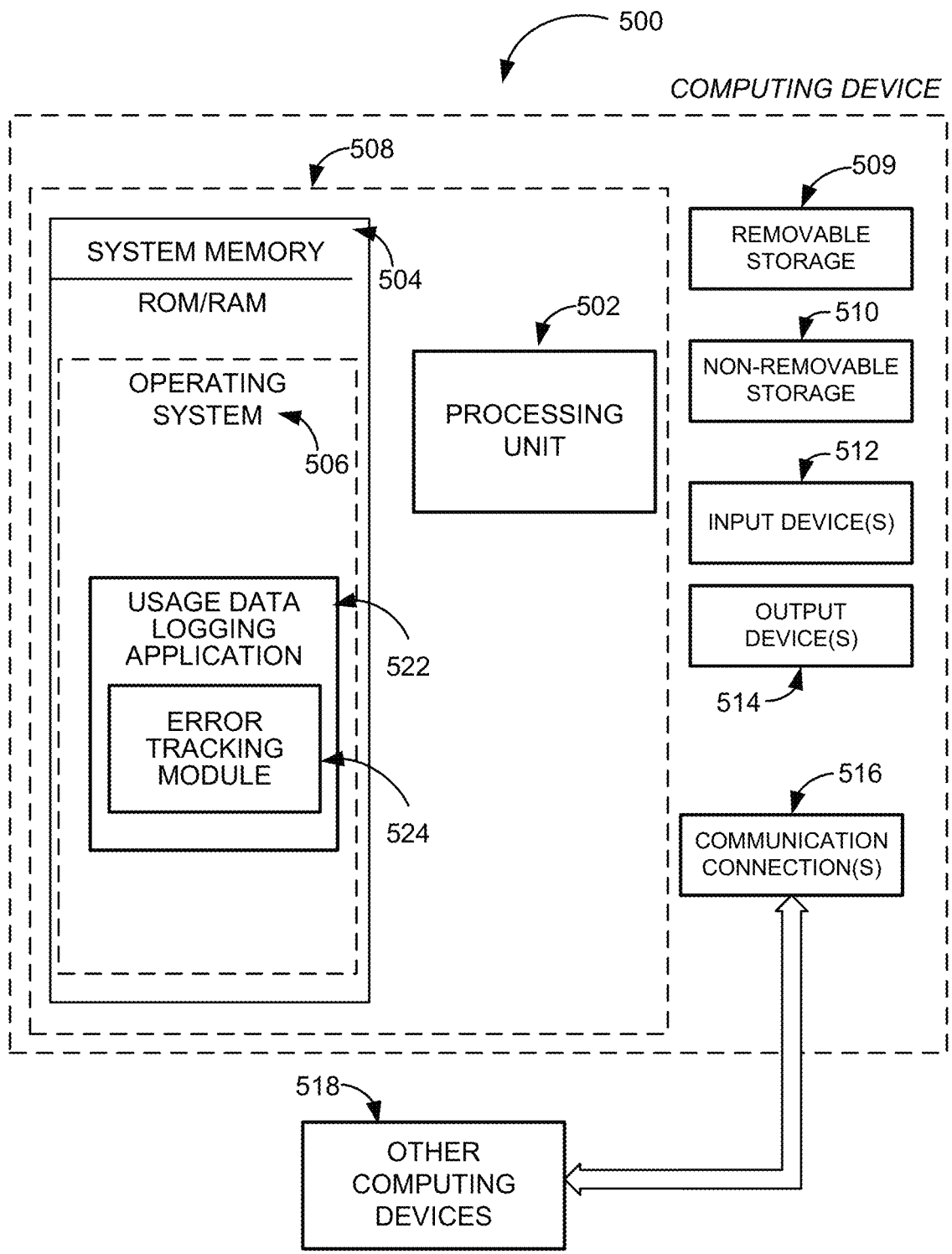
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any of the example devices discussed herein and may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 506 suitable for controlling the operation of the platform, such as the WINDOWS®, WINDOWS MOBILE®, or WINDOWS PHONE® operating systems from MICROSOFT CORPORATION of Redmond, Wash. The system memory 504 may also include one or more software applications such as usage data logging application 522 and error tracking module 524.

The error tracking module 524 may operate in conjunction with the operating system 506 or usage data logging application 522 to monitor requests as they are received at a collaborative service and are processed by one or more subsystems of the collaborative service, and to detect failures in processing the requests. The error tracking module 524, in conjunction with the usage data logging application 522, may detect when an error in processing a request occurs, and may create a record of detected errors. Detected errors may be categorized into buckets to create a comprehensive record of service errors. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods to provide a passive monitoring system employing a logging schema to track usage data in order to analyze performance and reliability of a service. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
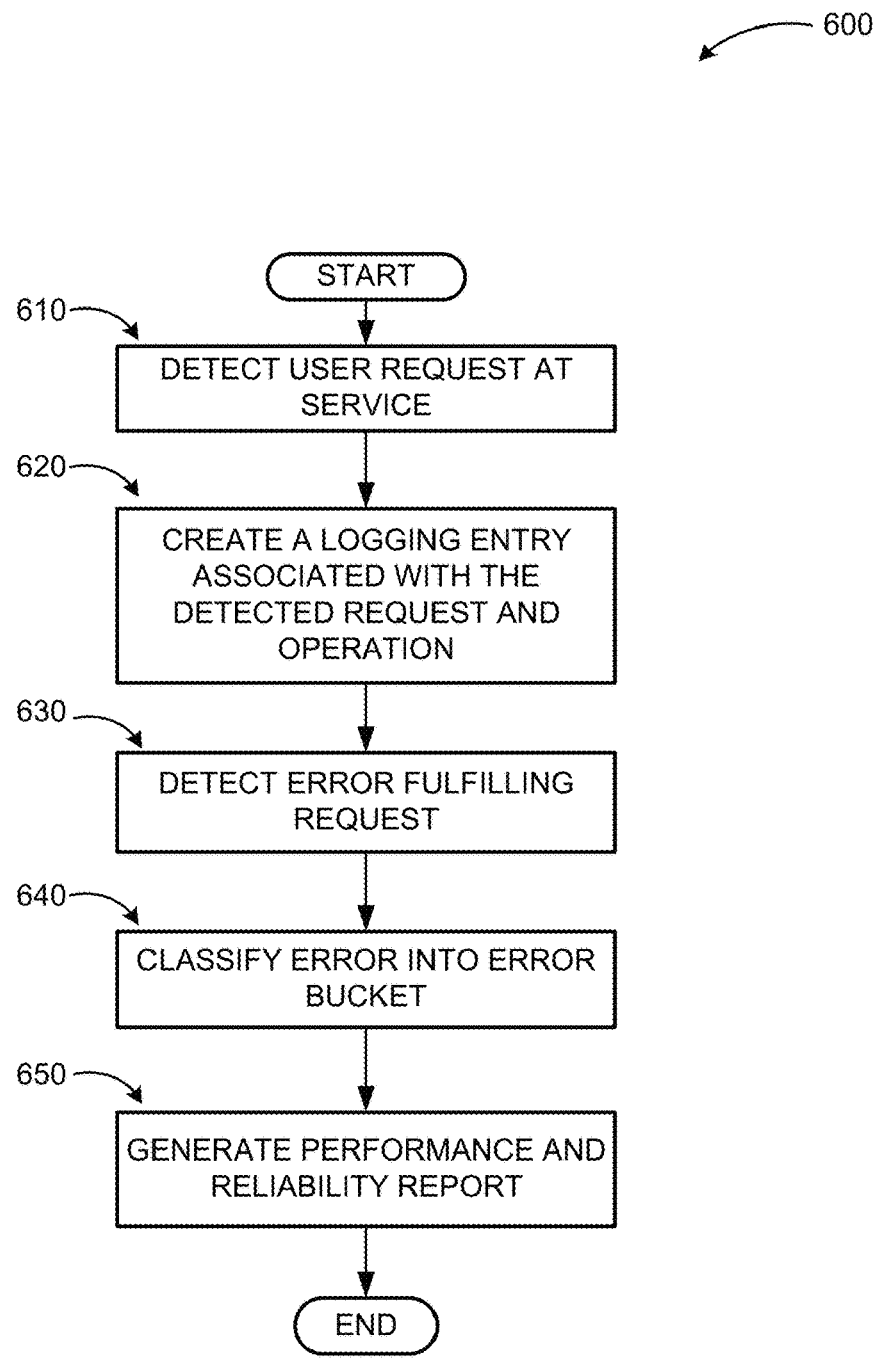
FIG. 6 illustrates a logic flow diagram for a process of providing a passive monitoring system employing a logging schema to track usage data in order to analyze performance and reliability of a service, according to embodiments.

FIG. 6 illustrates a logic flow diagram for a process of providing a passive monitoring system employing a logging schema to track usage data in order to analyze performance and reliability of a service, according to embodiments. Process 600 may be implemented as part of an application or an operating system.

Process 600 begins with operation 610, "DETECT USER REQUEST AT SERVICE" where a request to perform an operation is received at a collaborative service. A request may be any request received by the collaborative service by a user over a network to perform an operation associated with an application accessed at the user's client device.

Operation 610 is followed by operation 620, CREATE A LOGGING ENTRY ASSOCIATED WITH THE DETECTED REQUEST AND OPERATION," where a logging entry is created at a data store associated with the service. The logging entry may include the subsystem name processing the request, an operation identity, and the start and end time for the request.

Operation 620 is followed by operation 630, "DETECT ERROR FULFILLING REQUEST," where an operation performed by the subsystem to fulfill the request is identified, and an error performing the operation to fulfill the request is detected.

Operation 630 is followed by operation 640, "CLASSIFY ERROR INTO ERROR BUCKET," where a detected error may be classified into an error bucket, where the bucket denotes a failure scenario. A detected error may be classified into a pre-existing bucket based on error type, or if a detected error does belong in a pre-existing error bucket, a new bucket may be created.

Operation 640 is followed by operation 650, "GENERATE PERFORMANCE AND RELIABILITY REPORT," where a performance and reliability of the service may be calculated based on analysis of the buckets to compute error rates. Reports may be generated based on the logged error data to enable administrators of the service to evaluate and improve the service.

The operations included in process 600 are for illustration purposes. Providing a passive monitoring system employing a logging schema to track usage data in order to analyze performance and reliability of a service according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

The invention claimed is:

1. A method to monitor requests at a service, the method comprising:
   detecting a request received by the service;
   creating a logging entry for the request, wherein creating the logging entry for the request comprises for each subsystem to process the request, recording one or more of a subsystem name, a sub-operation name, an entry time and an exit time from the subsystem, a start time and an end time for the sub-operation performed by the subsystem to fulfill the request, or user locale information for the request;
   if the request is fulfilled by the service, logging an entry in a success bucket;
   if an error is detected in processing the request at the service classifying the detected error into an error bucket; and
   generating a report on a reliability of the service based on the success bucket and the error bucket.

2. The method of claim 1, wherein generating the report on the reliability of the service based on the success bucket and the error bucket comprises determining the reliability of the service based on a ratio of the success bucket to one or more error buckets.

3. The method of claim 1, wherein generating the report on the reliability of the service further comprises including raw data for one or more detected errors associated with the service.

4. The method of claim 1, further comprising providing a user interface to customize a logging schema according to which entries for requests and errors are logged.

5. The method of claim 4, further comprising receiving definitions of one or more subsystems of the service to be monitored, a monitoring frequency, and a type of data to be monitored.

6. The method of claim 1, further comprising recording the detected error in real-time before the request is processed and a response is returned.

7. The method of claim 1, further comprising monitoring sub-operations within each subsystem of the service that processes the request in order to detect a success or an error.

8. The method of claim 1, further comprising:
   determining a processing time of each subsystem to provide a response to the request from a recorded start time and a recorded end time; and
   using the processing time to determine service reliability.

9. A server to monitor requests at a service, the server comprising:
   a memory;
   a processor coupled to the memory, the processor executing an application, wherein the application is configured to:
   detect a request received by the service;
   create a logging entry for the request;
   if the request is fulfilled by the service, log an entry in a success bucket;
   if an error is detected in processing the request classify the detected error into an error bucket; and
   generate a report on a reliability of the service based on the success bucket and the error bucket, wherein the report includes one or more of a list of subsystems experiencing least usage, a list of subsystems experiencing most usage, an observation about a nature of user interaction with the service, or a pattern of operations performed by users under different scenarios.

10. The server of claim 9, wherein the application is configured to monitor processing of requests and log errors at a subsystem level.

11. The server of claim 10, wherein subsystems of the service are grouped under one or more of a front end, a middle layer, or a back end.

12. The server of claim 10, wherein the request is processed across multiple subsystems of the service sequentially or in parallel.

13. The server of claim 9, wherein the logging entry is stored in a data store and the data store includes a data store interface configured to receive usage data from multiple cloud-based services as part of a distributed system.

14. The server of claim 9, wherein the service is a collaboration service configured to facilitate one or more of communication exchange, document sharing, enterprise management, document management, file management, collaboration, social networking contacts management, calendar management, a data sharing, or application sharing.

15. The server of claim 9, wherein the request is one or more of initiating an application, opening a document, initiating a conversation, interacting with a document or application, or retrieving data associated with an application.

16. The server of claim 9, wherein the application is further configured to provide an alert based on one or more of a number of detected errors exceeding a predefined threshold value and the detected error being a new error.

17. A method to provide monitoring of cloud-based services, the method comprising:
- detecting a request received by the cloud-based services;
- creating a logging entry for the request;
- if the request is fulfilled by the cloud-based services, logging an entry in a success bucket;
- if an error is detected in processing the request at the cloud-based services, classifying the detected error into an error bucket;
- anonymizing user information for protection of user privacy; and
- generating a report on a performance and a reliability of the cloud-based services based on an analysis of the processing of the request.

18. The method of claim 17, further comprising generating the report based on a customizable time period and based on default and customizable parameters.

19. The method of claim 17, further comprising providing an alert based on one or more of a number of detected errors exceeding a predefined threshold value and the detected error being a new error.

20. The method of claim 17, wherein the report on the performance and the reliability of the cloud-based services is generated based in part on a ratio of the success bucket to one or more error buckets.

\* \* \* \* \*